(12) United States Patent
Lu et al.

(10) Patent No.: US 10,458,780 B2
(45) Date of Patent: Oct. 29, 2019

(54) MEASURING EQUIPMENT AND MEASURING METHOD

(71) Applicant: Industrial Technology Research Institute, Hsinchu (TW)

(72) Inventors: Min-Qiao Lu, Hsinchu (TW); Chin-Chia Chang, Hsinchu (TW); Yi-Chia Hsu, Hsinchu (TW); Kuo-Chih Wang, Hsinchu (TW); Yao-Hui Lee, Hsinchu (TW); Yi-Cheng Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 15/795,141

(22) Filed: Oct. 26, 2017

(65) Prior Publication Data

US 2018/0149471 A1 May 31, 2018

(30) Foreign Application Priority Data

Nov. 30, 2016 (TW) .............................. 105139436 A

(51) Int. Cl.
*G01B 11/00* (2006.01)
*G01B 11/24* (2006.01)

(52) U.S. Cl.
CPC ............ *G01B 11/24* (2013.01); *G01B 11/005* (2013.01)

(58) Field of Classification Search
CPC .... G01B 11/24; G01B 5/0025; G01B 11/005; G01B 21/20; G01B 11/22

(Continued)

(56) References Cited

U.S. PATENT DOCUMENTS

| 4,600,869 A | 7/1986 | Sekine et al. |
| 5,007,006 A | 4/1991 | Taylor et al. |

(Continued)

FOREIGN PATENT DOCUMENTS

| CN | 203024738 U | 6/2013 |
| CN | 203657755 U | 6/2014 |

(Continued)

OTHER PUBLICATIONS

Z. Zhang et al., "A Novel Method on Wheelsets Geometric Parameters on LIne Based on Image Processing," 2019 Internation al Conference on Measuring Technology and Mechatronics Automation, 2010, pp. 257-260.

(Continued)

*Primary Examiner* — Isiaka O Akanbi
(74) *Attorney, Agent, or Firm* — Mintz Levin Cohn Ferris Glovsky and Popeo, P.C.; Peter F. Corless; Steven M. Jensen

(57) ABSTRACT

A measuring equipment is provided. The equipment includes: a multi-axial actuated device; at least one sensor disposed on the multi-axial actuated device to adjust the orientation of the at least one sensor by the multi-axial actuated device, wherein scanning constraints of the sensor include a movable range of the at least one sensor, a scanning range of the at least one sensor and a scanning dead space of the at least one sensor for the contour of an object to be tested; a rotating device configured to rotate the object; and a processing device configured to obtain information relating to an optimal scanning orientation of the sensor based on the scanning constraints, and configured to control the multi-axial actuated device to adjust the at least one sensor.

20 Claims, 14 Drawing Sheets

(58) Field of Classification Search
USPC .......................... 356/601–624, 237.1–237.6
See application file for complete search history.

(56) References Cited

U.S. PATENT DOCUMENTS

| | | | |
|---|---|---|---|
| 5,446,545 | A | 8/1995 | Taylor |
| 5,506,683 | A | 4/1996 | Yang et al. |
| 5,731,870 | A | 3/1998 | Bartko et al. |
| 6,124,925 | A * | 9/2000 | Kaneko ............. B29D 30/0061 356/237.1 |
| 6,173,213 | B1 * | 1/2001 | Amiguet ................. G06K 9/00 700/226 |
| 7,065,462 | B2 | 6/2006 | Merrill et al. |
| 7,222,431 | B1 | 5/2007 | Norton et al. |
| 7,272,524 | B2 | 9/2007 | Brogardh |
| 7,274,469 | B2 | 9/2007 | Lou et al. |
| 7,564,571 | B2 | 7/2009 | Karabassi et al. |
| 7,567,351 | B2 | 7/2009 | Opsal et al. |
| 7,652,761 | B2 | 1/2010 | Somani et al. |
| 7,715,024 | B2 | 5/2010 | Sotgiu |
| 7,840,374 | B2 | 11/2010 | Lugtenburg |
| 7,853,038 | B2 | 12/2010 | Lee |
| 8,249,823 | B2 | 8/2012 | White et al. |
| 8,508,743 | B2 | 8/2013 | Keller et al. |
| 8,725,446 | B2 | 5/2014 | Wegmann |
| 2002/0011103 | A1 * | 1/2002 | Kimbara ................. B60C 25/05 73/146 |
| 2004/0051864 | A1 * | 3/2004 | Braghiroli ............... G01M 1/02 356/139.09 |
| 2005/0052658 | A1 | 3/2005 | Braghiroli |
| 2005/0058333 | A1 * | 3/2005 | Kaneko ................. G01B 11/24 382/141 |
| 2005/0068522 | A1 | 3/2005 | Dorrance et al. |
| 2012/0281239 | A1 * | 11/2012 | White ................... G01B 11/24 356/601 |

FOREIGN PATENT DOCUMENTS

| | | |
|---|---|---|
| EP | 1830157 A1 | 9/2007 |
| TW | M509894 U | 10/2015 |

OTHER PUBLICATIONS

K. Lee et al., "Automated inspectino planning of free-form shape parts by laser scanning," Robotics and Computer Integrated Manufacturing, 2010, pp. 201-210.

S. Son et al., "Automated laser scanning system for reverse engineering and inspection," International Journal of Machine Tools & Manufacture, 2002, pp. 889-897.

* cited by examiner

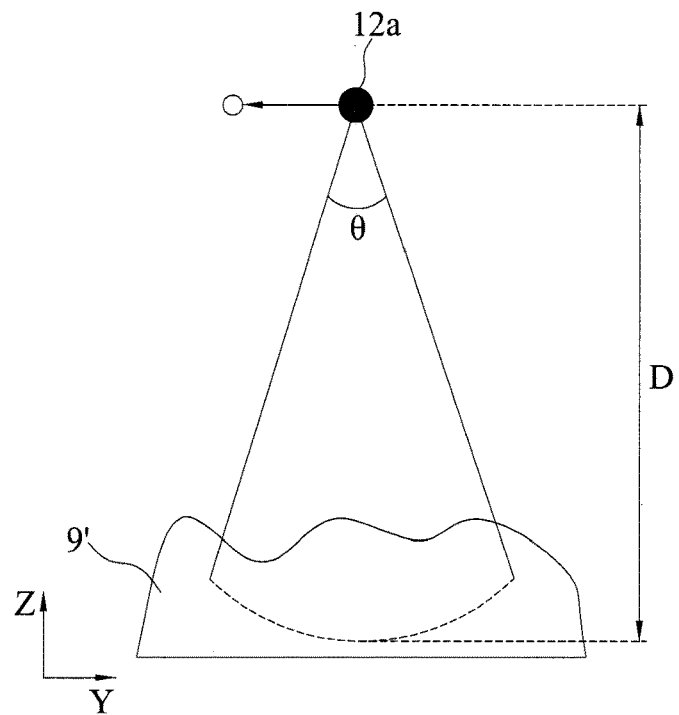
FIG. 2F
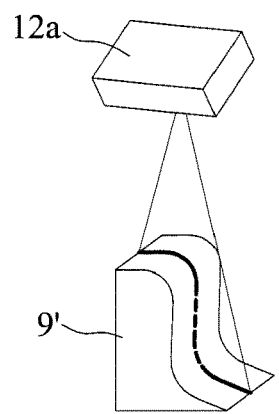
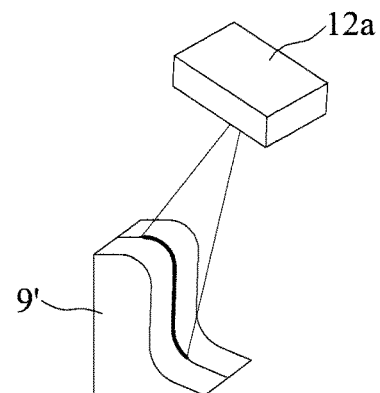
FIG. 2G  FIG. 2H

MEASURING EQUIPMENT AND MEASURING METHOD

CROSS-REFERENCE TO RELATED APPLICATION

The present application is based on, and claims priority from, Taiwan Application Serial Number 105139436, filed on Nov. 30, 2016, the disclosure of which is hereby incorporated by reference herein in its entirety.

TECHNICAL FIELD

The disclosure relates to a measuring equipment and a measuring method.

BACKGROUND

With the vigorous development of Computer Numerical Control (CNC), machining accuracy is continuously improved and widely applied to precision machine industries. However, with an aim of quality consistency for machining products, inspecting rules of quality management accuracy need to be passed. Currently, some products are inspected manually; however, manual inspection not only costs time but also has limitations for measurement accuracy. Thus, digital automatic inspection technics is gradually imported into markets.

Among nowadays inspections of quality management, according to needs of the products, plural types of inspected items can be determined, for example, inspected items of the vehicle wheel may include central hub, diameter of the aluminum wheel, Pitch Circle Diameter (PCD), Degree of deflection, flatness, position, thickness of the protruding edge, and so on, wherein some of the aforesaid items are classified as Dimensional Tolerances which can be inspected directly. However, some other items are classified as Geometric Tolerances, such as position, PCD and so on, usually need to be adaptability measured and ensured by manually comparison through tools, for example, a Micrometer.

However, if the traditional manual inspection for quality control is conducted in the automated production line, not only the detection accuracy is limited, but also time cost is increased, especially in precision machine production.

Accordingly, adoption of the automatic inspecting system in the automated production line is necessary for improving speeds of product quality management, so as for increasing the whole producing efficiency.

SUMMARY

According to an embodiment of the present disclosure, a measuring equipment is provided. The measuring equipment includes a multi-axial actuated device, at least one sensor, a rotating device and a processing device. The sensor is disposed on the multi-axial actuated and configured to scan an object to be tested, wherein scanning constraints of the at least one sensor include a movable range of the at least one sensor, a scanning range of the at least one sensor or a scanning dead space of the at least one sensor for a contour of the object. The rotating device is configured to rotate the object. The processing device is configured to obtain information relating to an optimal scanning orientation of the at least one sensor based on the scanning constraints, and configured to control the multi-axial actuated device to adjust the at least one sensor.

According to an embodiment of the present disclosure, a measuring method is provided. The method comprises fixing an object to be tested at a scanning region of a measuring equipment; synchronously rotating and scanning the object by at least one sensor of the measuring equipment for obtaining information of an object coordinate system of the object, wherein scanning constraints of the sensor include a movable range of the at least one sensor, a scanning range of the sensor and a scanning dead space of the at least one sensor for a contour of the object; constructing, by a processing device, the object coordinate system according to the obtained information of the object coordinate system; calculating, by the processing device, information relating to an optimal scanning orientation of the at least one sensor, including: associating the object coordinate system of the object to a base coordinate system, wherein the base coordinate system is determined according to a configuration of the measuring equipment; aligning the object coordinate system with a Computer-aided design (CAD) model coordinate system of the object, wherein the CAD model coordinate system is constructed in the processing device; and calculating a scanning position and a scanning angle of the at least one sensor in the CAD model coordinate system for adjusting a scanning position and a scanning angle of the at least one sensor in the base coordinate system; adjusting, based on the information relating to an optimal scanning orientation, the sensor and then scanning a contour of the object by the at least one sensor; and transforming, by the processing device, information of the contour of the object from the base coordinate system to the object coordinate system.

BRIEF DESCRIPTION OF THE DRAWINGS

FIG. 2F is a schematic view of actuation of a sensor in the measuring equipment shown in FIG. 1.

FIGS. 2G and 2H are perspective views of actuation of the sensor shown in FIG. 2F.

DETAILED DESCRIPTION OF DISCLOSED EMBODIMENTS

Figure 1:
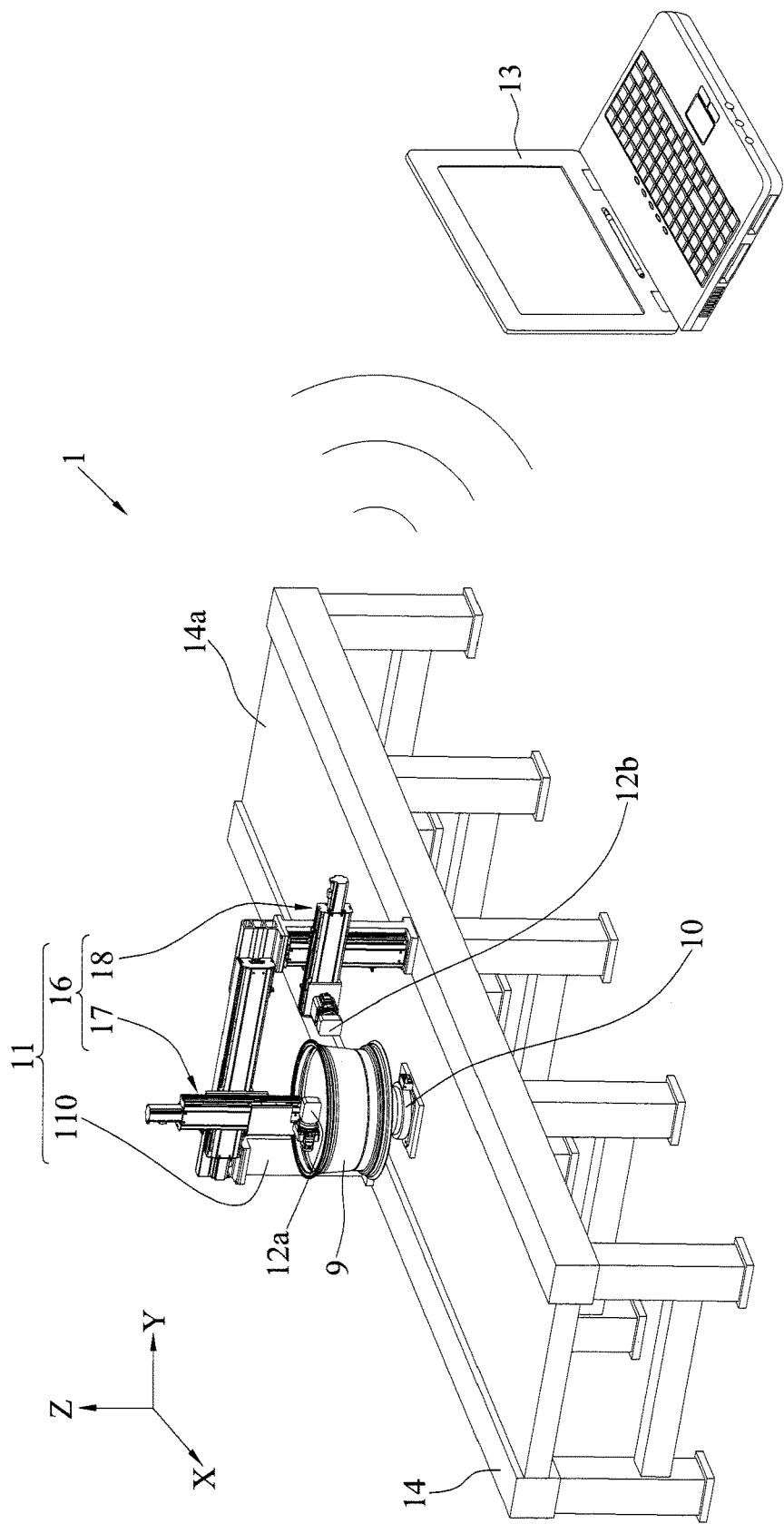
FIG. 1 is a perspective view of a measuring equipment according to a first embodiment of the disclosure.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

FIG. 1 is a perspective view of a measuring equipment 1 according to a first embodiment of the disclosure.

In FIG. 1, the measuring equipment 1 may include a rotating device 10, a multi-axial actuated device 11, sensors 12a and 12b, and a processing device 13.

The rotating device 10 may be disposed on a production machine such as on a scanning region of an inline production machine (for example, a fixing stage 14), and the rotating device 10 is configured to rotate an object 9 to be tested (for example, a steel wheel). The rotating device 10 may be a seat support for disposing the object 9 thereon.

In the embodiment, the rotating device 10 may include a rotating shaft, and a rotational axis of the rotating shaft may be substantially parallel to an axial direction (for example, the Z-axial direction as shown in FIG. 1) perpendicular to a loading surface 14a of the fixing stage 14, so that the object 9 may be rotated with respect to the axial direction.

Figure 2A:
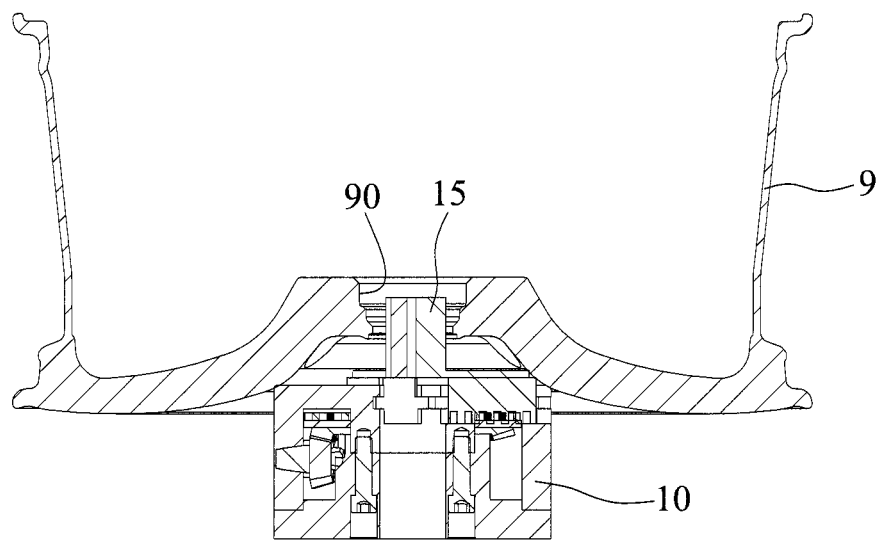
FIG. 2A is a sectional view of a portion of the measuring equipment shown in FIG. 1.

In addition, the rotating device 10 may be linearly moved upward or downward (for example, the positive or negative direction of the Z-axis) by an elevating mechanism, and the rotating device 10 may have a fixing part 15, as shown in FIG. 2A, to fix the object 9, so that the object 9 may be rotated with respect to the axial direction (for example, the Z-axial direction).

Figure 2B:
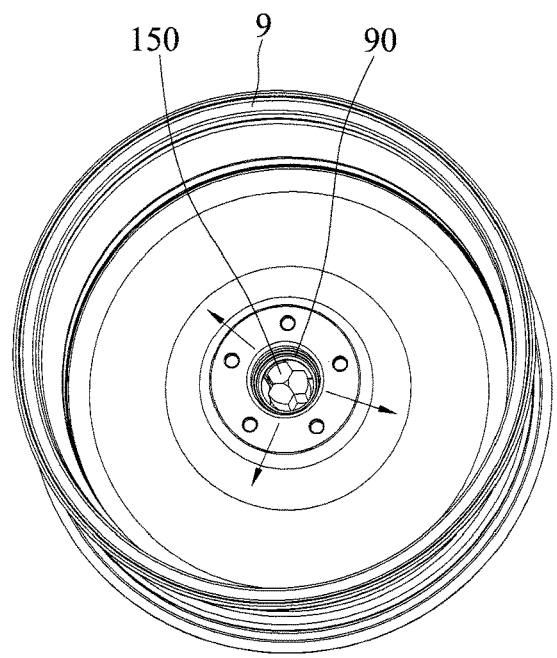
FIGS. 2B and 2C are top views of actuation of the measuring equipment shown in FIG. 2A.
Figure 2C:
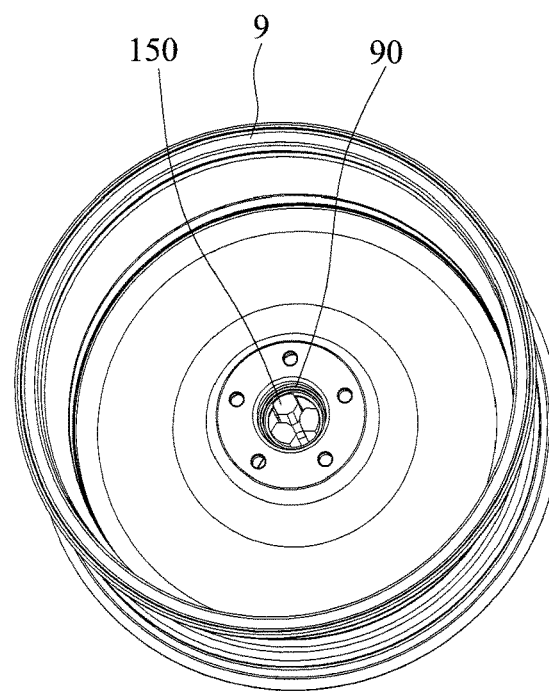

And, the fixing part 15 may include plural of fixtures 150 (as shown in FIG. 2B) and a motor (not shown) configured to drive those fixtures 150. For example, the fixtures 150 may be the fixtures of pistol grip types which can be driven and expand outward (for example, as shown in FIG. 2C) to reach the inner wall of a hole 90 of the object 9 (for example, a hole located at a bottom-center or any other position of a steel wheel) for fixing the object 9. The fixtures 150 may also be moved based on a size of the object 9 so as to be capable of fixing the objects 9 with different sizes.

Consequently, when the inspected object 9 is located at the fixing stage 14 corresponding to the rotating device 10, the rotating device 10 is lifted up and then the fixtures 150 are driven by the motor of the fixing part 15 to fix the object 9 (for example, as shown in FIG. 2C) for inspection. After end of the inspection, the fixtures 150 are driven by the motor to release the object 9 and then the rotating device 10 is turned down for moving the object 9 to next workstation.

There are many kinds of objects that can be considered. In embodiments of the disclosure, an object is considered based on the rotation motion during measurement. In one embodiment, according to the rotation of the fixing mechanics during measurement, the object 9 with reference surface or reference axis may be chosen for the inspection. For example, the object 9 may be a workpiece having an axial-symmetry structure, the workpiece may be typically an object having central hub such as a bearing, a brake disc, or a round wheel, but the scope of the disclosure is not limited thereto.

In embodiments of the disclosure, the multi-axial actuated device 11 may be installed on the fixing stage 14, and be around the rotating device 10 during measurement.

In the embodiment of FIG. 1, the multi-axial actuated device 11 may have a bridge-type and include a supporting frame 110 and a shifting assembler 16 disposed on the supporting frame 110, wherein the supporting frame 110 may be movably detached to the fixing stage 14 so that the shifting assembler 16 may be at top and one side (left or right side) of the rotating device 10 according to the movement of the supporting frame 110.

In addition, the supporting frame 110 may be linearly moved along forward or backward direction of the fixing stage 14 (for example, the X-axial direction shown in FIG. 1) by, for example, utilizing rail structures (not shown) disposed at left and right sides of the fixing stage 14.

And, as shown in FIG. 1, the shifting assembler 16 may include a first robotic arm 17 and a second robotic arm 18, wherein the first robotic arm 17 may be disposed at top of the rotating device 10 and the second robotic arm 18 may be disposed at left side of the rotating device 10.

Figure 2D:
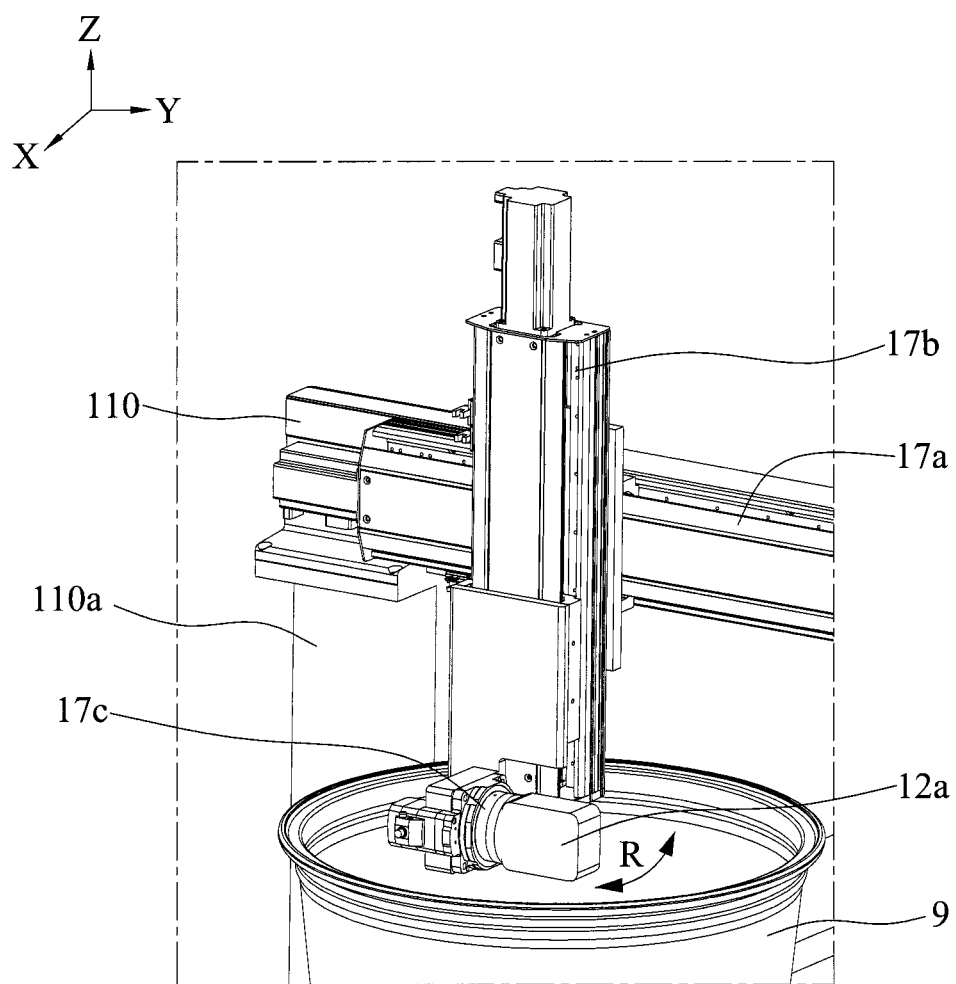
FIGS. 2D and 2E are perspective views of a portion of the measuring equipment shown in FIG. 1.

Specifically, as shown in FIG. 2D, the first robotic arm 17 may include two linear rails 17a, 17b and a first rotator 17c, wherein the linear rails 17a, 17b may be arranged along different axial directions (for example, the Y-axial rail 17a and the Z-axial rail 17b), and the Y-axial rail 17a may be bridged over two pillars 110a of the supporting frame 110, the Z-axial rail 17b may be disposed on the Y-axial rail 17a and configure to be shuttled left and right in the opposite direction of the supporting frame 110 and be stretched or retreated up and down in the opposite direction of the Y-axial rail 17a. The first rotator 17c may be disposed at the bottom-end of the Z-axial rail 17b and axially oscillated around the Y-axis (such as the back and forth oscillation of the arrow R).

Figure 2E:
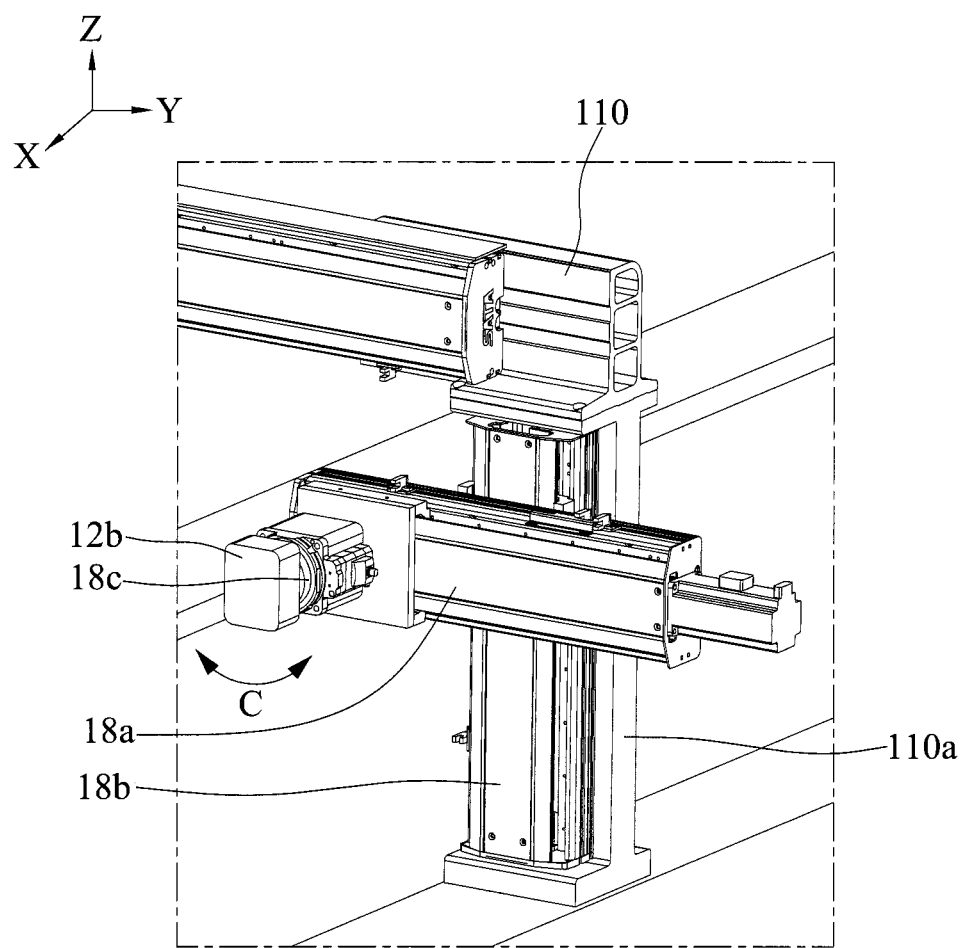

And, as shown in FIG. 2E, the second robotic arm 18 may include two linear rails 18a, 18b and a second rotator 18c, wherein the linear rails 18a, 18b may be arranged along different axial direction (for example, the Y-axial rail 18a and the Z-axial rail 18b), and the Z-axial rail 18b may be disposed on one of the pillars 110a of the supporting frame 110, the Y-axial rail 18a may be disposed on the Z-axial rail 18b and configure to be shuttled up and down in the opposite direction of the pillar 110a and stretched or retreated left and right in the opposite direction of the Z-axial rail 18b. The second rotator 18c may be disposed at the left-end of the Y-axial rail 18a and axially oscillated around the X-axis (such as the left and right oscillation of the arrow C).

Thence in measuring, the supporting frame 110 may firstly be moved for adjusting positions of the pillars 110a, to have the first robotic arm 17 being located at top of the rotating device 10, and then the first and second robotic arms 17 and 18 are actuated.

The aforementioned sensors 12a and 12b may respectively be disposed on the first and second rotators 17c and 18c of the multi-axial actuated device 11, so that the first and second robotic arms 17 and 18 can be actuated to adjust the orientations of the sensors 12a and 12b for sensing, and hence the object 9 fixed on the rotating device 10 can be measured effectively by the sensors 12a and 12b. In other words, with the first and second robotic arms 17 and 18 of the shifting assembler 16, the multi-axial actuated device 11 may adjust the orientations of the sensors.

In the embodiment, the sensors 12a and 12b may be optical sensors, such as laser-type rangefinder, but the scope of the disclosure is not limited thereto.

And, scanning constraints of the sensors 12a and 12b may include a movable range of the sensor, a scanning range of the sensor or a scanning dead space of the sensor for a contour of the object. Specifically, the sensor 12a or 12b may be an optical rangefinder for scanning an object to measure the geometric dimension of the object, but a scanning dead space (for example, as the dash line shown in FIG. 2G) of the sensor may be aroused due to a contour of the object 9'; and the sensor 12a or 12b may have intrinsic constraints in specifications, such as the range of a View Angle θ (for example, the limitation of an angle between an incident line of light-beam and a normal line of the scanned surface shown in FIG. 2F), the valid Depth of Field D (for example, the limitation of scanning depth), and so on. In addition, a movable range of the sensor 12a or 12b may be restricted by the multi-axial actuating device 11. Therefore, aforesaid constraints may need to be solved for obtaining more complete or valid measuring data of the object 9 from the measuring equipment 1, for example, constraints of scanning dead space of the sensor due to the contour of the object 9' can be solved by adjusting orientations of the sensor 12a or 12b, as shown in FIG. 2H).

Therefore, a movable range of the sensor 12a or 12b may be determined according to the structural design of the multi-axial actuated device 11, a scanning range of the sensor 12a or 12b may be determined according to species of the sensor, and a scanning dead space of the sensor due to the contour of the object may be determined according to the structure such as the contour of the object 9 to be tested.

In addition, considering the random variations raised from the installation of the object 9, the location and the posture of the sensor 12a or 12b may be dynamically or adaptively adjusted when installing the object 9 to the measuring equipment 1. And then, after fixing the object 9, a contour of the object 9 can be measured by rotating the object 9 relative to the sensor 12a or 12b, so that dimensions of the object 9 can be obtained from the measuring and some specific dynamic features, such as runout of the object 9, may also be obtained from the measuring.

The aforesaid processing device 13 is configured to deal with the scanning constraints of the sensor 12a or 12b, to have the sensor 12a or 12b being adjusted to an optimal direction or posture by the multi-axial actuated device 11.

In the embodiment, the processing device 13 may be a control computer or a portable computer. The processing device 13 may include a controller, an Arithmetic Unit (AU), a processor or known hardware.

In addition, the processing device 13 may be wirely or wirelessly coupled to the sensors 12a and 12b for receiving information, wherein the information may include information of movable ranges of the sensors 12a and 12b, scanning ranges of the sensors 12a and 12b or a scanning dead space relating to the contour of the object 9.

And, the processing device 13 may be electrically coupled to the multi-axial actuated device 11 for controlling movement of the multi-axial actuated device 11.

Figure 3A:
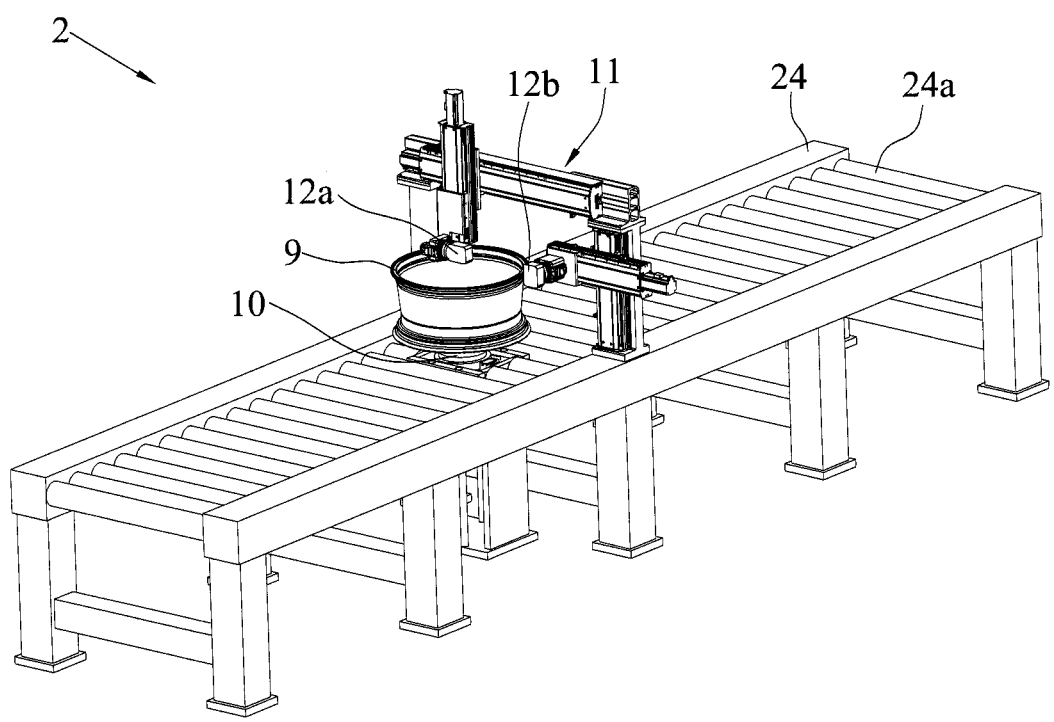
FIG. 3A is a perspective view of a measuring equipment according to a second embodiment of the disclosure.
Figure 3B:
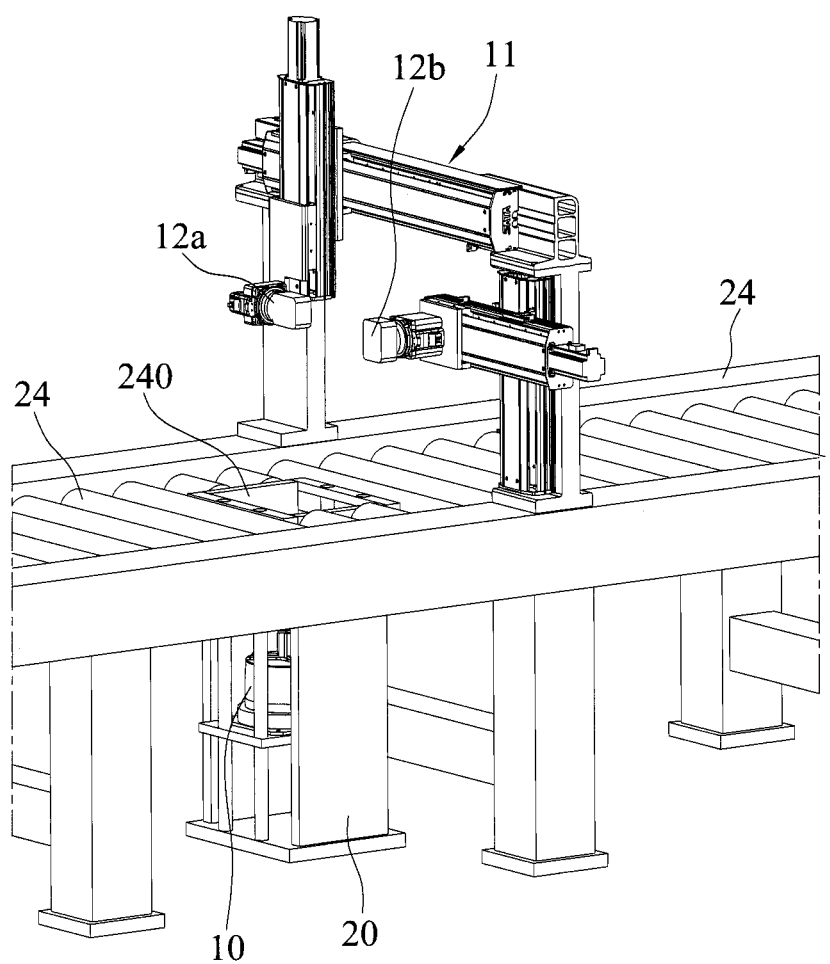
FIG. 3B is another perspective view of the measuring equipment shown in FIG. 3A.

FIGS. 3A and 3B are perspective views of a measuring equipment 2 according to a second embodiment of the disclosure. In the embodiment, the production stage is apparently different from the fixing stage 14 of the first embodiment, and other structures of the equipment 2 and the equipment 1 of the first embodiment may be same or similar.

As shown in FIG. 3A, the production stage may be a transportation stage 24, for example a conveyor, and a transportation belt of the transportation stage 24 may be constituted of plural flattened roll bars 24a as a roller conveyor.

In the embodiment, the transportation stage 24 has an opening 240 at the location corresponding to the rotating device 10, as shown in FIG. 3B, so that the rotating device 10 can be elevated through the opening 240 by an elevator 20 for fixing the object 9.

In an embodiment, the transportation belt of the transportation stage 24 may be constituted of an isolation belt with well ductility.

Figure 4A:
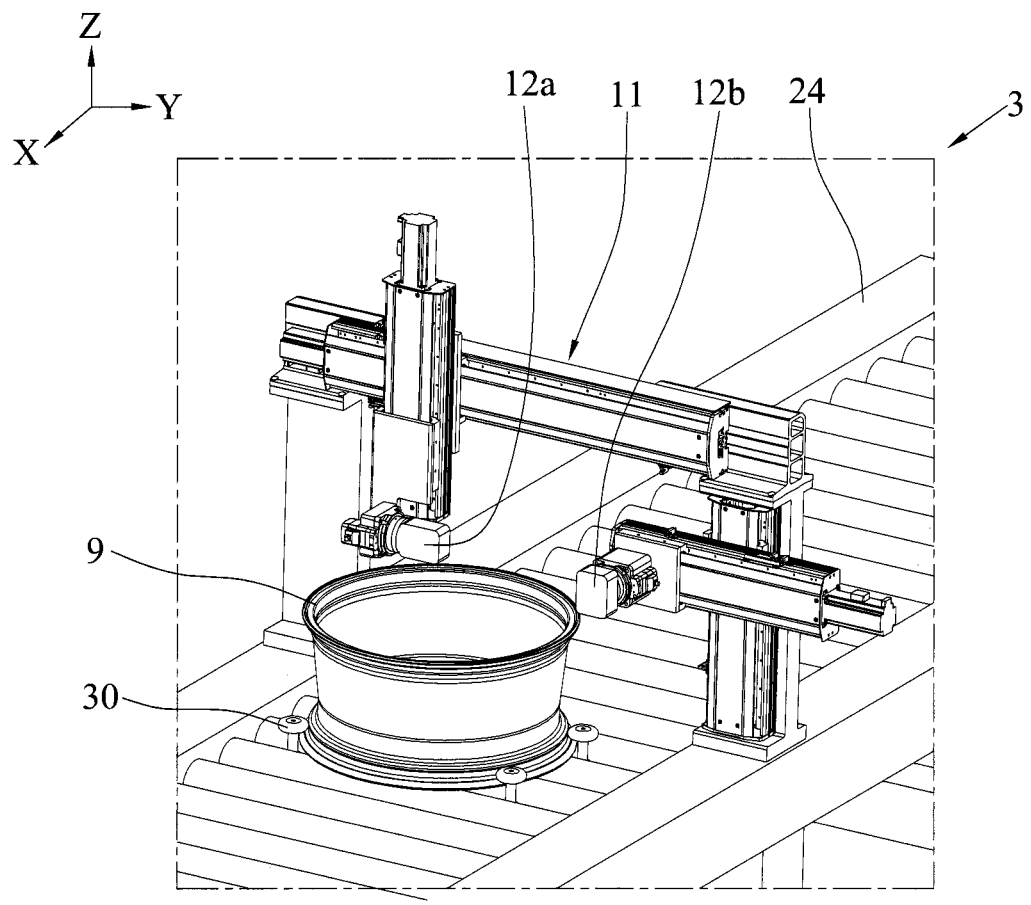
FIG. 4A is a perspective view of a portion of a measuring equipment according to a third embodiment of the disclosure.
Figure 4B:
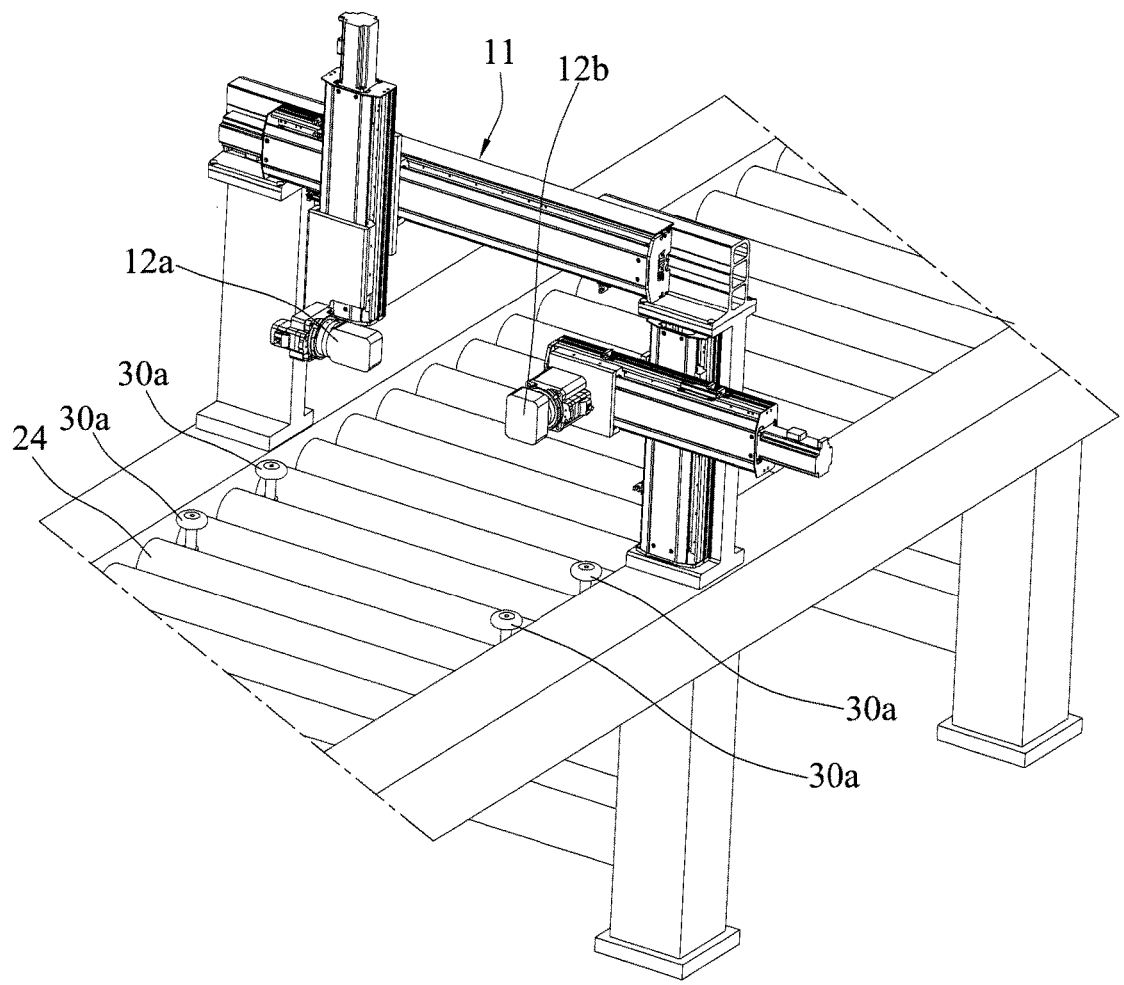
FIG. 4B is another perspective view of the measuring equipment shown in FIG. 4A.

FIGS. 4A and 4B are perspective views of a measuring equipment 3 according to a third embodiment of the disclosure. In the embodiment, the rotating device is apparently different from the one of the second embodiment, and other structures of the equipment 3 and the equipment 2 of the second embodiment may be same or similar.

As shown in FIGS. 4A and 4B, the rotating device 30 includes standing bars 30a capable of being laterally moved, so that the standing bars 30a can withstand the object 9, thereby fixing object 9 when the object 9 is in the scanning region.

In the embodiment, four standing bars 30a of the rotating device 30 are arranged so that they have spaces between them, and a rectangular contour is thus formed to facilitate fixing the object 9, but the scope of the disclosure is not limited thereto.

And, the object 9 may be driven to rotate through the self-rotating of the standing bar 30a around a vertical axis of the standing bar 30a, wherein the vertical axis of the standing bar 30a may be in an up-and-down direction or the Z-axial direction shown in FIG. 4A. Understandingly, the mutual motion between the standing bars 30a and the object 9 is same as the rotation of the transform, and, therefore, the mechanism for the mutual rotating motion between them may be embodied through gear, friction or the likes.

While only two sensors 12a and 12b are illustrated in aforesaid three embodiments, it will be understood those sensors 12a and 12b may be determined through working with the configurations of the multi-axial actuated devices 11 of the equipment 1, 2 and 3, respectively. Therefore, a measuring equipment of the disclosure may include a single sensor or at least three sensors capable of scanning top or side of the object 9, but the scope of the disclosure is not limited thereto.

Figure 5:
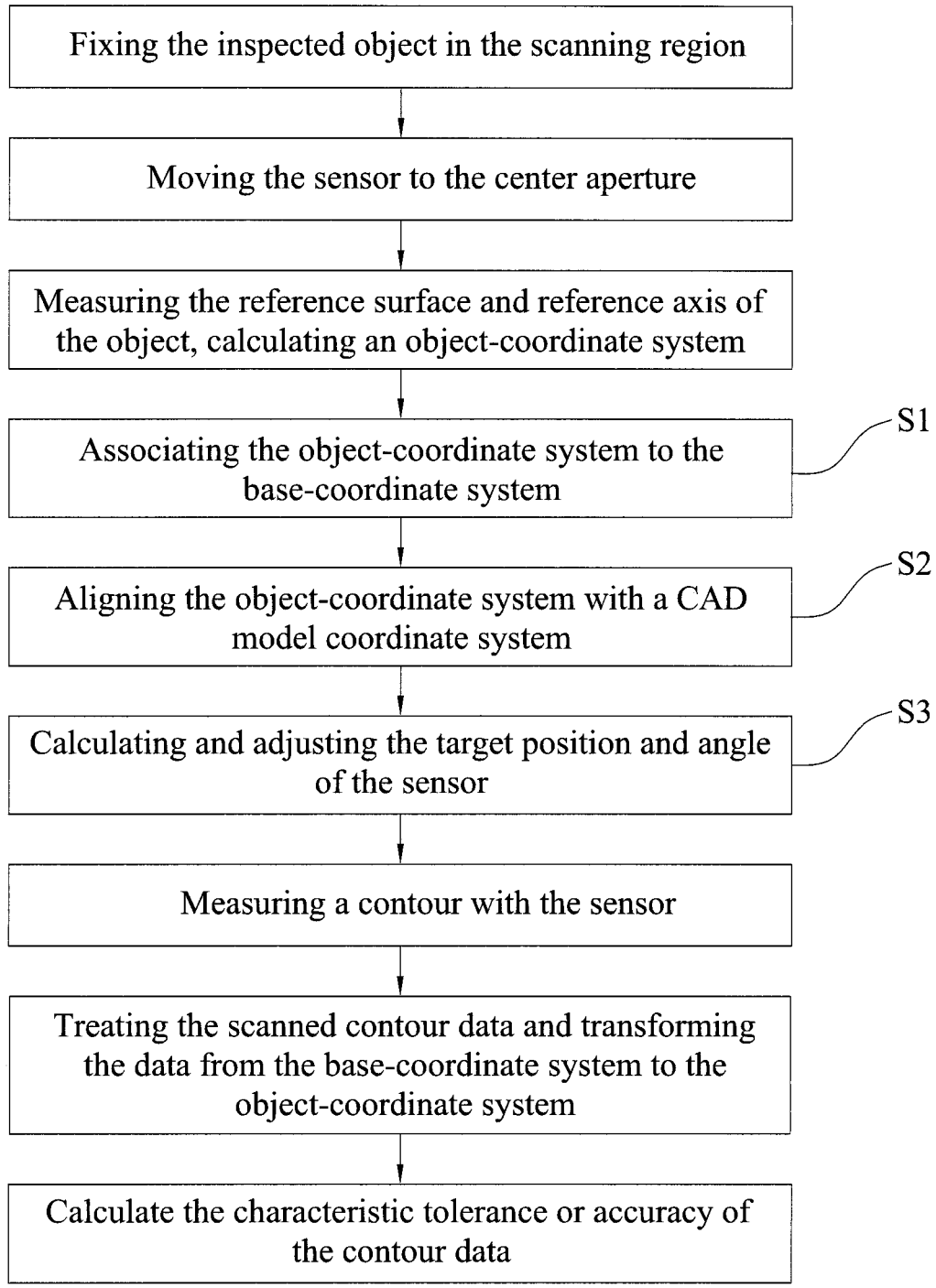
FIG. 5 is a schematic flow diagram of a measuring method according to an embodiment of the disclosure.

FIG. 5 is a schematic flow diagram of a measuring method according to an embodiment of the disclosure. In the embodiment, the measuring method may be embodied by the aforesaid equipment 1, 2 or 3.

Figure 6A:
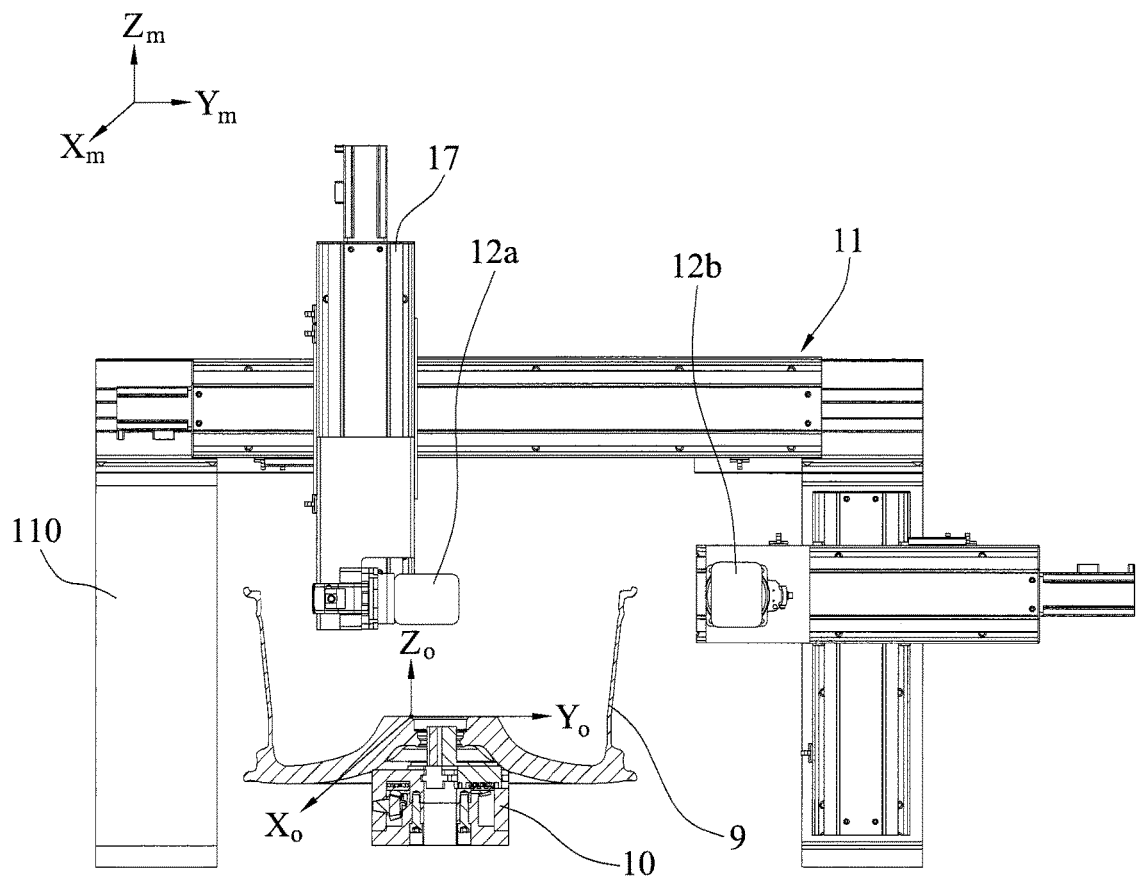
FIGS. 6A and 6B are schematic views of coordinate systems by applying a measuring equipment for the steps S1 and S2 of FIG. 5.

As shown in FIG. 6A, before the three steps S1 to S3 of analyzing an optimal scanning orientation of the sensor, constructing an object coordinate system ($X_o$, $Y_o$, $Z_o$) of the object 9 to be tested is performed, including: obtaining an object coordinate system ($X_o$, $Y_o$, $Z_o$) of the object 9 after the object 9 is fixed in a scanning region (for example, fixed on the rotating device 10 or 30). In the embodiment, the supporting frame 110 and the first robotic arm 17 are utilized for moving the sensor 12a to the top region of the rotational axis (for example, the region above the center of the object 9 as shown in FIG. 2D) of the rotating device 10 or 30, and then rotating the object 9 by the rotating device 10 or 30 and scanning the object 9, synchronously, for measuring a reference surface or a reference axis so as to construct the object coordinate system ($X_o$, $Y_o$, $Z_o$) in the processing device 13.

Next, the optimal scanning orientation of the sensor 12b is analyzed for the second robotic arm 18, as the steps S1 to S3 shown in FIG. 5, exemplary details are disclosed in the following.

Step S1: Associating the object coordinate system ($X_o$, $Y_o$, $Z_o$) to a base coordinate system ($X_m$, $Y_m$, $Z_m$), as shown in FIG. 6A, wherein the base coordinate system ($X_m$, $Y_m$, $Z_m$) may be determined according to the configuration of the equipment 1, 2 or 3. In the embodiment, random derivations may arise at times as fixing the object 9 to the equipment 1, 2 or 3, and hence a transformation relation between the object coordinate system ($X_o$, $Y_o$, $Z_o$) and the base coordinate system ($X_m$, $Y_m$, $Z_m$) may need to be constructed.

Figure 6B:
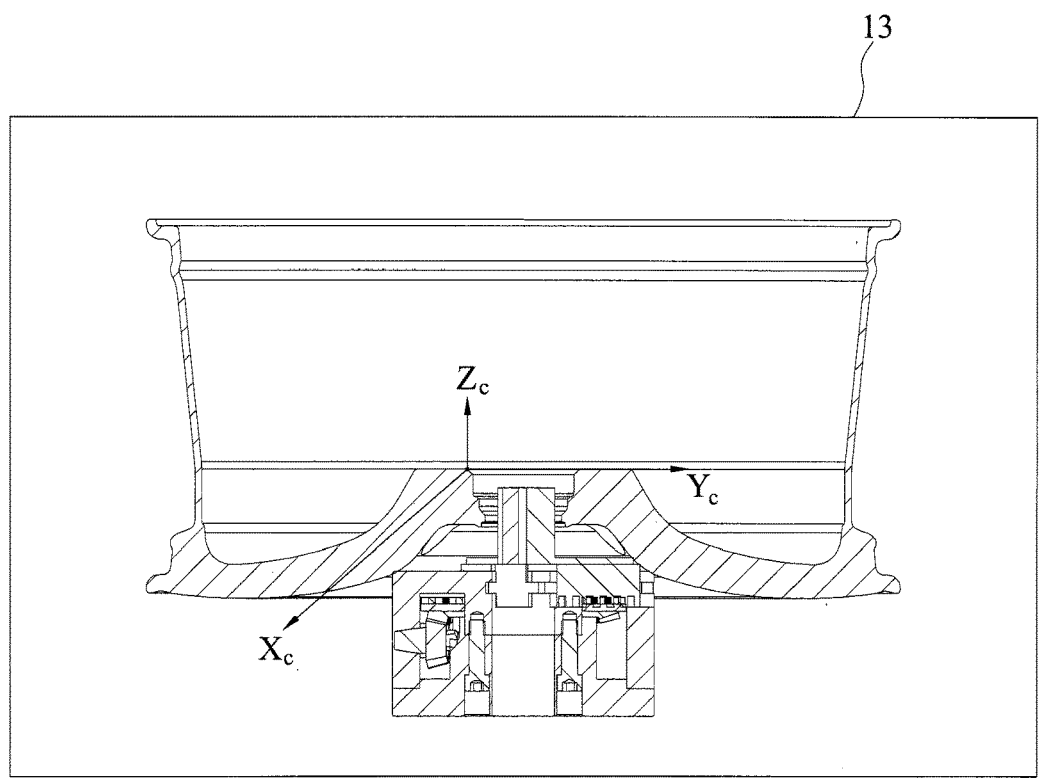

Step S2: Aligning the object coordinate system ($X_o$, $Y_o$, $Z_o$) with a CAD model coordinate system ($X_c$, $Y_c$, $Z_c$) of the object 9, as shown in FIG. 6B, for obtaining a transformation relation between the object coordinate system ($X_o$, $Y_o$, $Z_o$) and the CAD model coordinate system ($X_c$, $Y_c$, $Z_c$). In the embodiment, the CAD (Computer-aided design) model coordinate system ($X_c$, $Y_c$, $Z_c$) may be stored in the processing device 13.

Step S3: Calculating the scanning position and the scanning angle of the sensor 12b in the CAD model coordinate system ($X_c$, $Y_c$, $Z_c$), then transforming the scanning position and the scanning angle to the base coordinate system ($X_m$, $Y_m$, $Z_m$), so as to adjust orientations (for example, scanning position and the scanning angle) of the sensor 12b for scanning.

In the embodiment, the optimal scanning orientation of the sensor 12b may be obtained by adopting probabilistic technique to analyzing a curve surface of the object 9, wherein the probabilistic technique may solve a combinatorial optimization problem. For example, in Step S3, an optimization algorithm, such as Genetic Algorithm (GA), may be performed to calculate the scanning position and the scanning angle of the sensor 12b in the CAD model coordinate system. In an embodiment, the optimization algorithm may be Simulated annealing (SA), Particle Swarm Optimization (PSO), and so on, but the scope of the disclosure is not limited thereto.

Figure 7:
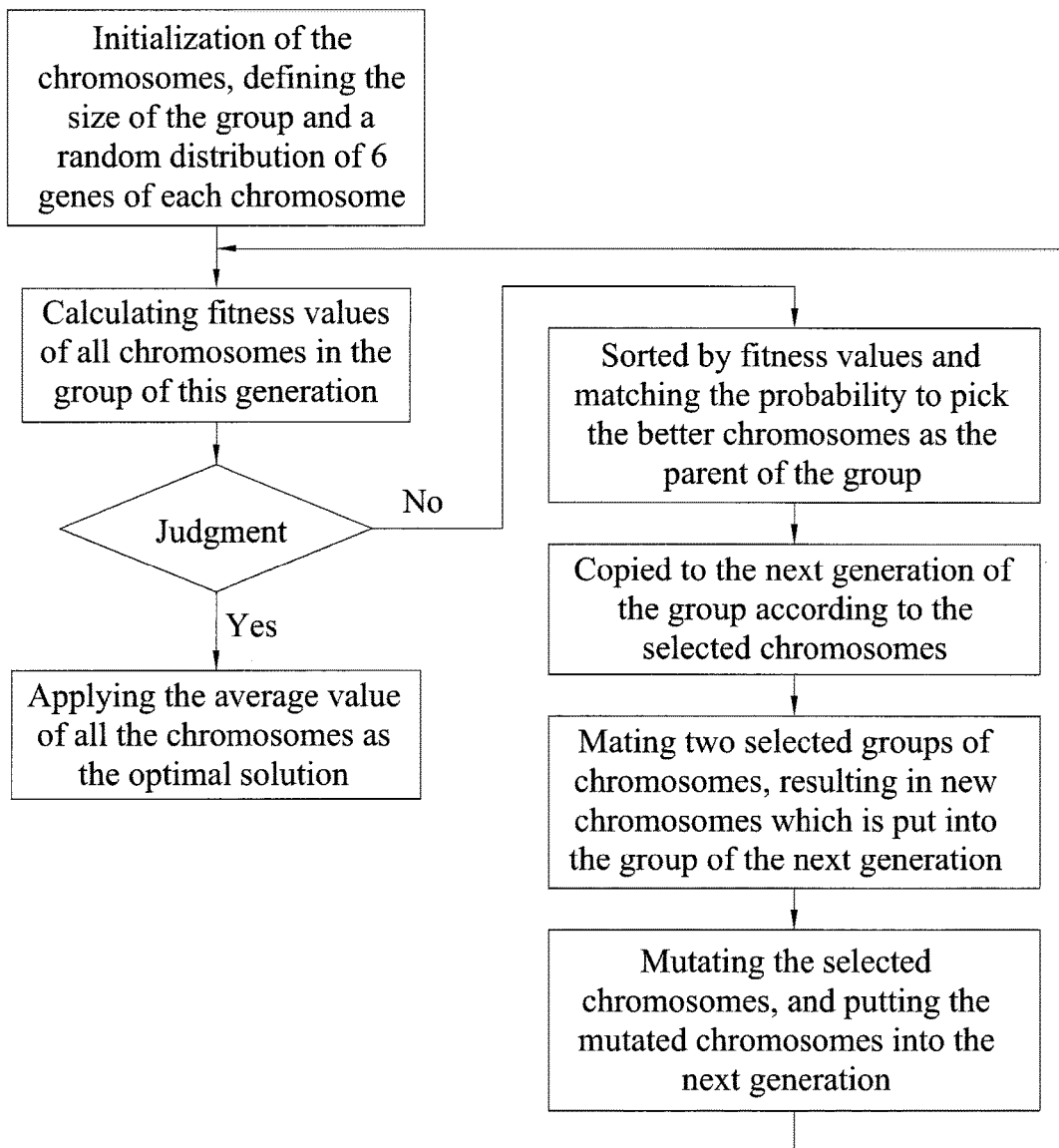
FIG. 7 is a schematic flow diagram of a calculating method for the step S3 of FIG. 5.

In addition, as shown in FIG. 7, exemplary details of performing Genetic Algorithm (GA) may include the following.

Initialization: Assigning six genes to each chromosome, wherein three of the six genes are assigned as parameters of scanning position and the other three of the six genes are assigned as parameters of scanning angle, and defining ranges of each gene (for example, scanning ranges of the sensor 12a and 12b).

Evaluation: Calculating fitness values (for example, scanning ranges effectively covering the curve surface of the object) of all the chromosomes (for example, the scanning positions and the scanning angles) in the group of a generation.

Termination Criteria: Judging whether those fitness values of the whole chromosomes are good or bad, and if an ending threshold is passed then calculating an average of all the chromosome and assigning the average as the optimal solutions, otherwise entering processes such as Selection, Reproduction, Crossover, Mutation, and so on for re-Evaluation.

And, the sensor 12b has following constraints: a movable range of the sensor 12b; a scanning dead space relating to the contour of the object; and constraints of scanning range, such as View Angle θ of the sensor 12b, Depth of Field D of the sensor 12b, and so on. Therefore, utilizing the Optimization Algorithms to calculate an optimal scanning position and an optimal scanning angle of the sensor 12b where the sensor 12b may effectively scan the curve surface of the object 9, so that meaningless scan data and measurement time may be effectively reduced.

Figure 6C:
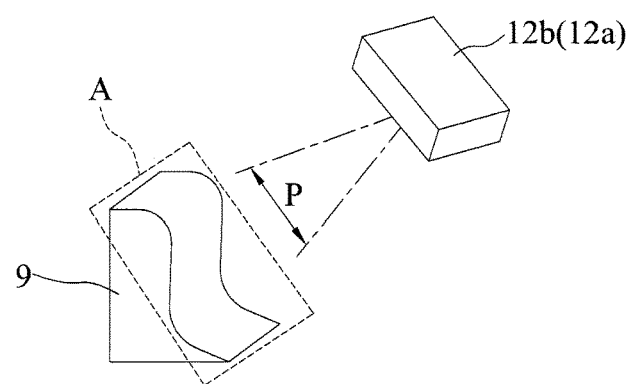
FIG. 6C is a schematic view of applying a sensor of a measuring equipment for the step S3 of FIG. 5.

After Step S3, as shown in FIG. 5, a second rotational scanning is proceeded with adjusting, by the second robotic arm 18, the sensor 12b to an optimal or better scanning orientation, as shown in FIG. 6C (a scanning range P of the sensor 12b can cover a projected area A of the curve surface of the object 9), and then the rotating device 10 or 30 is actuated so that the sensors 12a and 12b can synchronously scan the object 9, and the processing device 13 is utilized to process the scanned contour data from the sensors 12a and 12b and transform coordinates of the scanned contour data from the base coordinate system ($X_m$, $Y_m$, $Z_m$) to the object coordinate system ($X_o$, $Y_o$, $Z_o$).

And then, the processing device 13 obtains and stores the transformed scanned contour data for calculating feature tolerances or feature accuracy of the object 9.

Accordingly, the aforesaid exemplary method may be executed with the measuring equipment 1,2 or 3 of the present disclosed embodiments; utilize the rotating device 10 or 30 and the multi-axial actuated device 11 for overcoming scanning constraints of the sensors 12a and 12b, so that an user may fix the inspected object 9 on the rotating device 10 or 30; utilize the sensor 12a of the first robotic arm 17 for scanning the object 9 and obtaining information of reference surface or reference axis of the inspected object 9; calculate the object coordinate system ($X_o$, $Y_o$, $Z_o$) based on the information of the reference surface or the reference axis and then obtain a transformation relation between the object coordinate system ($X_o$, $Y_o$, $Z_o$) and the base coordinate system ($X_m$, $Y_m$, $Z_m$) of the measuring equipment. After that, the object coordinate system ($X_o$, $Y_o$, $Z_o$) may be aligned with a CAD model coordinate system ($X_c$, $Y_c$, $Z_c$) of the object 9 for calculating an optimal measuring angle of the object 9 in the CAD model coordinate. After the optimal measuring angle of the object 9 in the CAD model coordinate system is transformed, the sensor 12b, disposed on second robotic arm 18, may be automatically adjusted to an optimal scanning position and an optimal scanning angle of the sensor 12b in the base coordinate system ($X_m$, $Y_m$, $Z_m$), and then the sensors 12a and 12b can scan the object 9 synchronously for preventing invalid measurement.

In addition, in the embodiments, based on the pre-known CAD model of the object 9, a better or optimal scanning location and a better or optimal scanning posture of the sensor 12b may be calculated in order to overcome scanning constraints of the sensor 12b.

And, it should be understood that the disclosed method is not limited to be applied with the embodied measuring equipment 1, 2, or 3 of the present disclosure.

According the aforementioned embodiments, the disclosed method and the equipment may utilize the rotating device and the multi-axial actuated device for overcoming scanning constraints of the sensors, so as to prevent or lower invalid measurement, reduce time for repeating adjustment and working time of machine operations, and reduce mis-measurements arisen from movements.

In summary, the method and the equipment disclosed in aforementioned embodiments may be applied on Automated Production Line, for example, especially on Fine Machining Production, so as to improve measurement accuracy and save production time and efforts.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A measuring equipment, comprising:
   a multi-axial actuated device;
   at least one sensor disposed on the multi-axial actuated device and configured to scan an object to be tested, wherein scanning constraints of the sensor include a movable range of the at least one sensor, a scanning range of the at least one sensor, and a scanning dead space of the at least one sensor for a contour of the object;

a rotating device configured to rotate the object and free from being fixed to the multi-axial actuated device; and a processing device configured to obtain information relating to an optimal scanning orientation of the at least one sensor based on the scanning constraints, and configured to control the multi-axial actuated device to adjust the at least one sensor, wherein obtaining the information relating to the optimal scanning orientation of the at least one sensor includes:

associating the object coordinate system of the object to a base coordinate system, wherein the base coordinate system is determined according to a configuration of the measuring equipment;

aligning the object coordinate system with a Computer-aided design (CAD) model coordinate system of the object, wherein the CAD model coordinate system is constructed in the processing device; and calculating a scanning position and a scanning angle of the at least one sensor in the CAD model coordinate system for adjusting a scanning position and a scanning angle of the at least one sensor in the base coordinate system.

2. The measuring equipment of claim 1, wherein the rotating device is disposed on a production machine.

3. The measuring equipment of claim 1, wherein the rotating device is a seat support.

4. The measuring equipment of claim 1, wherein the rotating device includes a fixing part for fixing the object to the rotating device.

5. The measuring equipment of claim 1, wherein the multi-axial actuated device has a shifting assembler for adjusting an orientation of the at least one sensor.

6. The measuring equipment of claim 5, wherein the shifting assembler includes two robotic arms.

7. The measuring equipment of claim 5, wherein the shifting assembler includes:
two linear rails arranged along different axial directions and configured to be moved oppositely; and
a rotator combined with the at least one sensor and is disposed on one of the two linear rails.

8. The measuring equipment of claim 1, wherein the at least one sensor includes at least one optical sensor.

9. The measuring equipment of claim 1, wherein the processing device includes a computer.

10. The measuring equipment of claim 1, wherein the rotating device includes a standing bar for withstanding and rotating the object by self-rotating of the standing bar around a vertical axis of the standing bar.

11. A measuring method, comprising:
fixing an object to be tested in a scanning region of a measuring equipment;
synchronously rotating and scanning the object by at least one sensor of the measuring equipment for obtaining information of an object coordinate system of the object, wherein scanning constraints of the sensor include a movable range of the at least one sensor, a scanning range of the at least one sensor and a scanning dead space of the at least one sensor for a contour of the object;
constructing, by a processing device, the object coordinate system according to the obtained information of the object coordinate system of the object;
calculating, by the processing device, information relating to an optimal scanning orientation of the at least one sensor, including:
associating the object coordinate system of the object to a base coordinate system, wherein the base coordinate system is determined according to a configuration of the measuring equipment;
aligning the object coordinate system with a Computer-aided design (CAD) model coordinate system of the object, wherein the CAD model coordinate system is constructed in the processing device; and
calculating a scanning position and a scanning angle of the at least one sensor in the CAD model coordinate system for adjusting a scanning position and a scanning angle of the at least one sensor in the base coordinate system;
after calculating the information relating to the optimal scanning orientation, adjusting, based on the information relating to an optimal scanning orientation, the at least one sensor, and then scanning a contour of the object by the at least one sensor by rotating the object relative to the sensor; and
transforming, by the processing device, information of the contour of the object from the base coordinate system to the object coordinate system.

12. The measuring method of claim 11, wherein the measuring equipment further includes:
a multi-axial actuated device configured to be disposed with the at least one sensor thereon and adjust orientations of the at least one sensor; and
a rotating device configured to be disposed on the scanning region and rotate the object for scanning the object by the at least one sensor.

13. The measuring method of claim 12, wherein, when the rotating device rotates the object, the at least one sensor scans the object for obtaining a reference surface and a reference axis so as to construct the object coordinate system.

14. The measuring method of claim 12, wherein the multi-axial actuated device includes a shifting assembler for adjusting an orientation of the at least one sensor.

15. The measuring method of claim 14, wherein the shifting assembler includes two robotic arms.

16. The measuring method of claim 14, wherein the shifting assembler includes:
two linear rails arranged along different axial directions and configured to be moved oppositely; and
a rotator combined with the at least one sensor and disposed on one of the two linear rails.

17. The measuring method of claim 11, wherein the at least one sensor includes at least one optical sensor.

18. The measuring method of claim 11, wherein the processing device includes a computer.

19. The measuring method of claim 11, wherein calculating the scanning position and the scanning angle of the at least one sensor in the CAD model coordinate system further includes adopting an optimization algorithm for calculating the scanning position and the scanning angle of the at least one sensor.

20. The measuring method of claim 19, wherein the optimization algorithm is Genetic Algorithm, Simulated annealing or Particle Swarm Optimization.

* * * * *